(12) United States Patent
Abe

(10) Patent No.: US 12,069,075 B2
(45) Date of Patent: Aug. 20, 2024

(54) SECURITY MONITORING SYSTEM

(71) Applicant: DENSO CORPORATION, Kariya (JP)

(72) Inventor: Taiji Abe, Kariya (JP)

(73) Assignee: DENSO CORPORATION, Kariya (JP)

( * ) Notice: Subject to any disclaimer, the term of this patent is extended or adjusted under 35 U.S.C. 154(b) by 495 days.

(21) Appl. No.: 17/385,980

(22) Filed: Jul. 27, 2021

(65) Prior Publication Data

US 2022/0038480 A1 Feb. 3, 2022

(30) Foreign Application Priority Data

Jul. 29, 2020 (JP) ................. 2020-128467

(51) Int. Cl.
*H04L 9/40* (2022.01)
*G06F 8/65* (2018.01)
*H04W 4/40* (2018.01)

(52) U.S. Cl.
CPC ............ *H04L 63/1425* (2013.01); *G06F 8/65* (2013.01); *H04L 63/1433* (2013.01); *H04L 63/1441* (2013.01); *H04W 4/40* (2018.02)

(58) Field of Classification Search
None
See application file for complete search history.

(56) References Cited

U.S. PATENT DOCUMENTS

| 2015/0169311 A1* | 6/2015 | Dickerson ................. G06F 8/65 717/170 |
| 2018/0295147 A1 | 10/2018 | Haga et al. |
| 2019/0306187 A1 | 10/2019 | Dyakin et al. |
| 2020/0042306 A1 | 2/2020 | Kiyama et al. |
| 2020/0396238 A1 | 12/2020 | Haga et al. |
| 2020/0409678 A1* | 12/2020 | Ju ............................ G06F 8/65 |
| 2021/0211442 A1* | 7/2021 | Haga ................... H04L 63/1416 |
| 2021/0409434 A1* | 12/2021 | Hasegawa ........... H04L 63/1416 |

FOREIGN PATENT DOCUMENTS

| JP | 2017111796 A | 6/2017 |
| JP | 2019-194831 A | 11/2019 |
| JP | 2020021381 A | 2/2020 |
| JP | 2020-065242 A | 4/2020 |

* cited by examiner

*Primary Examiner* — Syed A Roni
(74) *Attorney, Agent, or Firm* — Harness, Dickey & Pierce, P.L.C.

(57) ABSTRACT

A security monitoring system that detects abnormalities in moving body and analyzes a response method includes: a reception unit that receives a security log from the moving body; an attack determination unit that analyzes the security log to determine whether or not there was a cyber attack; a dynamic response permission confirmation unit that confirms whether communication with a software distribution management server (i.e., an over the air (OTA) center or simply a management server) is permitted; an information requesting unit that requests the OTA center for predetermined information when communication with the OTA center is permitted; and an execution instruction unit that instructs the OTA center to execute software update of the moving body based on the received predetermined information.

11 Claims, 13 Drawing Sheets

SECURITY MONITORING SYSTEM

CROSS REFERENCE TO RELATED APPLICATION

The present application is based on and claims the benefit of priority of Japanese Patent Application No. 2020-128467, filed on Jul. 29, 2020, the disclosure of which is incorporated herein by reference.

TECHNICAL FIELD

The present disclosure generally relates to a device that detects and analyzes a cyber attack, and relates to a security monitoring system installed outside a vehicle.

BACKGROUND INFORMATION

In recent years, technologies for driving support and automated driving control, including V2X such as vehicle-to-vehicle communication and road-to-vehicle communication, have been attracting attention. Along with such trend, vehicles have come to be equipped with a communication function, and vehicles are becoming more "connected." As a result, vehicles may be increasingly vulnerable to cyber attacks. Since a vehicle may lose control due to a cyber attack, stronger defense measures are required against the cyber attack.

SUMMARY

It is an object of the present disclosure is to realize a security monitoring system that enables cooperation between a security monitoring system and a software distribution management server. Another object of the present disclosure may be, for example, to realize a device, a method, and a program capable of quickly detecting, responding to, and recovering from a cyber attack.

BRIEF DESCRIPTION OF THE DRAWINGS

Objects, features, and advantages of the present disclosure will become more apparent from the following detailed description made with reference to the accompanying drawings, in which.

DETAILED DESCRIPTION

An embodiment of the present disclosure will be described below with reference to the drawings.

1. EMBODIMENT (1) Configuration of the Entire Constituent Device Group

Figure 1:
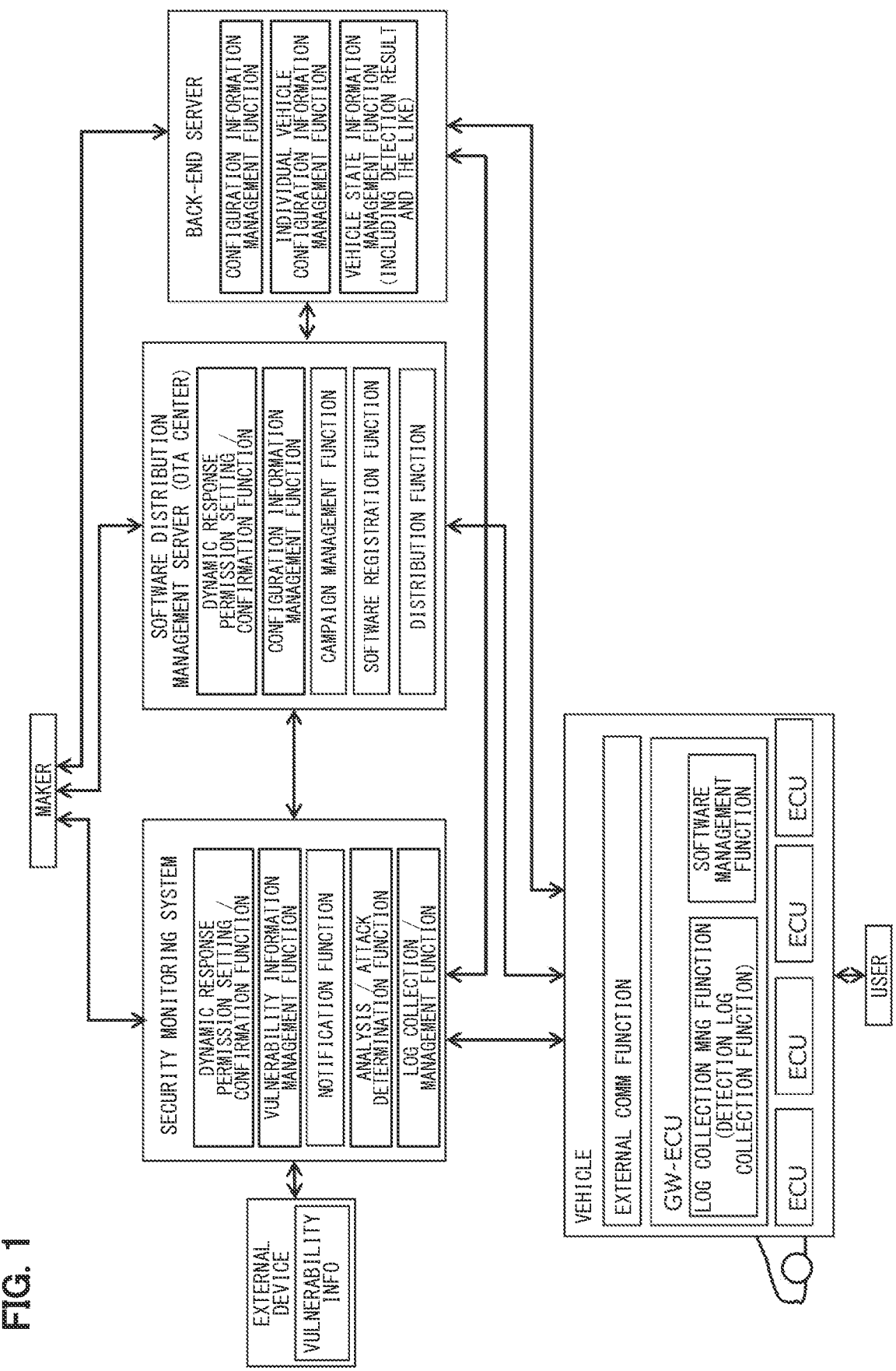
FIG. 1 is an overview of a group of constituent devices according to an embodiment of the present disclosure.

First, the configuration of the entire constituent device group (i.e., all of the constituent devices grouped as a system) in the present embodiment will be described with reference to FIG. 1. In the description and drawings, a function may mean a part of a device that executes the function, an execution state of the function, and a program that executes the function.

An in-vehicle device is mounted on a vehicle that is a moving body. The in-vehicle device includes an external communication function, a GW-ECU (gateway ECU), a log management function (also known as a detection log collection function), a software management function, and ECUs connected to the GW-ECU. The GW-ECU (gateway ECU) may include the log management function (also known as a detection log collection function) and the software management function.

The electronic control unit (ECU) may be any device as long as it processes information and exerts a specific function, regardless of a name it bears. For example, a device called an information processing device, an information processing circuit, a control unit, a control device, a calculation device, or the like may all be used as an ECU. Also, the form of the ECU is arbitrary, providable as a component such as a semiconductor circuit and a semiconductor module, or as a semi-finished product such as an electronic control device and an electronic control unit, or as a finished product such as a server, a workstation, a personal computer (PC), a smartphone, a phone, or a navigation system.

The software management function is a function of managing (i) software downloadable from a software distribution management server and installable in each ECU or GW-ECU, and (ii) a software update status of each ECU or GW-ECU. A log collection management function collects logs from each ECU and detects an abnormality.

The in-vehicle device is connected to a security monitoring system, a software distribution management server (hereinafter referred to as an OTA center), and a back-end server via a communication network.

The communication network of a wireless communication method may be, for example, IEEE802.11 (WiFi (registered trademark)), IEEE802.16 (WiMAX (registered trademark)), W-CDMA (Wideband Code Division Multiple Access), HSPA (High Speed Packet Access), LTE (Long Term Evolution), LTE-A (Long Term Evolution Advanced), 4G, 5G and the like. DSRC (Dedicated Short Range Communication) may also be a wireless communication method of the network. The communication network of a wired communication method may be, for example, a LAN (Local Area Network), the Internet, or a fixed telephone line. The wireless communication network may be a combination of a wireless communication method and a wired communication method. For example, a wireless communication method may be used for communication between the in-vehicle device and the base station device in a cellular system, and a wired communication method such as a trunk line of a communication company or the Internet may be used for communication between the base station device and the security monitoring system or the OTA center.

The GW-ECU and each ECU in the in-vehicle device may be respectively made up from a general-purpose CPU (Central Processing Unit), volatile memory such as RAM, non-volatile memory such as ROM, flash memory, or hard disk, as well as various interfaces, and an internal bus connecting the above. Then, by executing the software on one or more CPUs, it can be configured to exert the function of each of the function blocks shown in FIG. 1. Of course, these devices may be realized by dedicated hardware such as LSI or the like.

Figure 2:
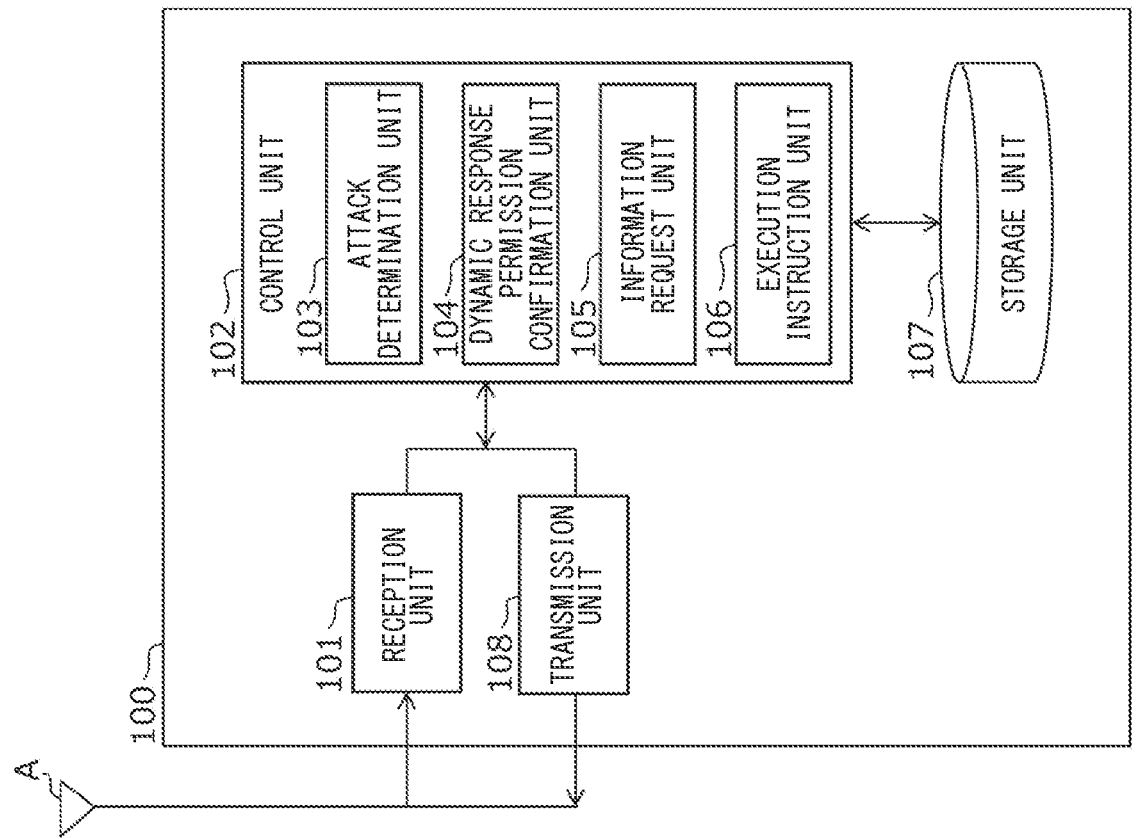
FIG. 2 is a block diagram showing a configuration example of a security monitoring system according to the embodiment of the present disclosure.

The security monitoring system includes a dynamic response permission setting/confirmation function, a vulnerability information management function, a notification function, an analysis/attack determination function, and a log collection/management function. The dynamic response permission setting/confirmation function is a function for setting update permission with the security monitoring system and a function for confirming whether communication with the security monitoring system is permitted. The vulnerability information management function is a function that manages vulnerability information acquired from an external device. The notification function is a function for submitting a report to a maker. The analysis/attack determination function is a function that analyzes logs to determine whether or not there has been an attack. The log collection/management function is a function for collecting and managing logs received directly from the vehicle or received from the vehicle via the back-end server. Details of the security monitoring system will be described with reference to FIG. 2.

A security monitoring system 100 is a device or a system of devices, which detects an abnormality in a vehicle that is a "moving body" and analyzes a response method. The moving body means a moveable object, and the moving speed of the moveable object is not particularly restricted. The moving body may stop. For example, the moving body includes, but is not limited to, vehicles, motorcycles, bicycles, pedestrians, ships, aircrafts, and objects mounted on these.

The security monitoring system 100 includes a reception unit 101, a control unit 102, a storage unit 107, and a transmission unit 108. The control unit 102 controls the operations of the reception unit 101, the storage unit 107, and the transmission unit 108, and realizes an attack determination unit 103, a dynamic response permission confirmation unit 104, an information request unit 105, and an execution instruction unit 106.

The reception unit 101 receives a security log from a vehicle. However, things received from a vehicle are not limited to security logs, but may include normal logs, abnormal logs, and other data and requests/instructions from vehicles.

The attack determination unit 103 analyzes the security log received by the reception unit 101 to determine whether or not there has been a cyber attack.

The dynamic response permission confirmation unit 104 confirms whether or not "communication" with the OTA center is permitted. The confirmation is performed, for example, by referring to permission data issued by an automobile manufacturer or an owner of the OTA center. Alternatively, a permit request may be sent to the automobile manufacturer or to the owner of the OTA center. Here, "communication" includes not only performing communication but also an exchange of specific information as well as request/instruction to the OTA center.

When communication with the OTA center is permitted, the information request unit 105 inquires the OTA center about existence of predetermined information. Then, if the OTA center possesses the predetermined information, a request requesting the predetermined information is generated and transmitted to the OTA center.

For example, the predetermined information may be at least one of configuration information, individual vehicle configuration information, campaign information, campaign progress information, and OTA contract information. The configuration information is information regarding a configuration of a specific vehicle type. The individual vehicle configuration information is information regarding a configuration of individual vehicles. The campaign information is information related to software distribution, which may be, for example, information indicating that a predetermined software distribution has been decided for a specific vehicle in order to solve a problem. The campaign progress information is information indicating how far a campaign is in progress (e.g., has been performed). The OTA contract information is information of a contract for a software distribution service between the OTA center and individual vehicles. For example, it is information that guarantees to rewrite/update software of an ECU of the vehicle to the one distributed wirelessly from the OTA center.

The execution instruction unit 106 instructs the OTA center to execute the software update of the vehicle based on the predetermined information transmitted from the OTA center in response to a request. In addition to the execution instruction, the execution instruction unit 106 may instruct execution contents.

The storage unit 107 stores predetermined information received from the OTA center in addition to the security log received by the reception unit 101. In addition, the storage unit 107 may store past analysis results, report contents, a manufacturer's provisional response/recovery method for past attacks, information that supports attack determination, and vulnerability information.

The transmission unit 108 transmits instructions and information to the vehicle. In addition, the transmission unit 108 outputs a first report and a periodic report.

Returning to FIG. 1, the OTA center is a software distribution management server that distributes software to each ECU or GW-ECU that constitutes an in-vehicle device used in a vehicle. The OTA center has a dynamic response permission setting/confirmation function, a configuration information management function, a campaign management function, a software registration function, and a distribution function. The dynamic response permission setting/confirmation function is a function for setting update permission with the security monitoring system and a function for confirming whether communication with the security monitoring system is permitted. The configuration information management function is a function for managing and storing configuration information and individual vehicle configuration information. The campaign management function is a function that manages a schedule and execution of a campaign based on the campaign information. The software registration function is a function with which the maker/manufacturer registers the software to be distributed to the OTA center. The distribution function is a function of distributing software to a vehicle via a communication network.

The back-end server is a server owned by an automobile maker/manufacturer. The back-end server has a configuration information management function, an individual vehicle configuration information management function, and a vehicle state information management function. The configuration information management function is a function for managing and storing configuration information. The individual vehicle configuration information management function is a function for managing and storing individual vehicle configuration information. The vehicle state information management function is a function for managing and storing vehicle state information transmitted from the vehicle, such as position information, speed information, door opening/closing information, and the like. The vehicle state information may be a detection result in which a cyber attack or an abnormality is detected in the vehicle.

In addition, there is an external device that manages publicly-disclosed vulnerability information.

The security monitoring system, the OTA center, and the back-end server are connected using a wired communication method or a wireless communication method. The security monitoring system, the OTA center, and the back-end server in the present embodiment may be basically assumed as a server device, i.e., a finished product of a computer maker, but are not necessarily limited thereto. For example, a workstation, a personal computer (PC) as a form of a finished product, an ECU as a form of a semi-finished product, and a semiconductor circuit element as a form of a component may also be assumed.

(2) Operation of the Constituent Device Group

The operation of the constituent device group of the present embodiment is shown with reference to FIGS. 3 to 13. The following operations not only show the method performed by the relevant device(s) of the constituent device group, but also show the processing procedure of the program that can be executed by those devices. The order of processing is not limited to the one shown in FIGS. 3 to 13. That is, the order may be swapped as long as there is no restriction, such as a relationship where one step uses the result of the step before it.

The outline of the flow shown in FIGS. 3 to 13 is as follows.

a: Upload detection information, such as logs, from the vehicle to the security monitoring system b: The security monitoring system analyzes the log, determines the attack, and identifies whether or not such an event has occurred in the past.

c: When the security monitoring system may respond dynamically, that is, when communication with the OTA center is permitted, information (VIN) that identifies a vehicle is identified and an inquiry is sent to the OTA center. The security monitoring system acquires individual vehicle information, campaign information, OTA contract information, etc. regarding the attacked vehicle from the OTA center.

d: Based on the information acquired in c and the determination result of b together with other information, the following points are confirmed by the security monitoring system, and the response is determined.

d1: Is response to prevent/mitigate cyber attack predetermined (i.e., prepared in advance)? Is the response content a software update?

d2: Has the d1 software update been issued as a campaign?

d3: Has the campaign not been applied to the subject vehicle?

e: Instruct/request the OTA center to perform the campaign from the security monitoring system.

With such a configuration and operation, when the response content is determined in the cyber attack that occurred in the past, the security monitoring system and the OTA center can respond to such attack, in which no determination and processing required in the maker/manufacturer, thereby enabling a quick response to and recovery from the cyber attack.

Figure 3:
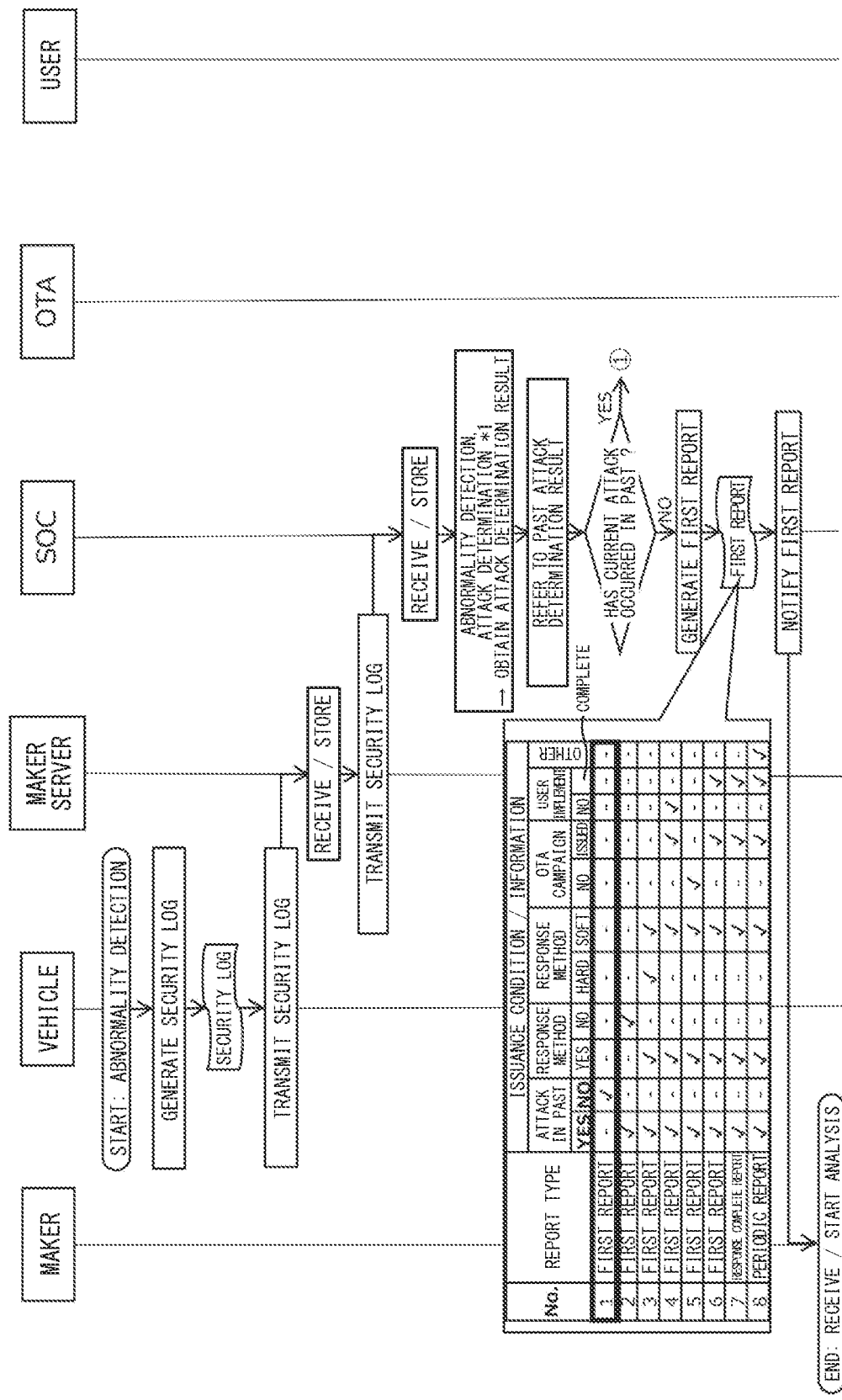
FIG. 3 is a flowchart showing an operation of the group of constituent devices according to the embodiment of the present disclosure.

In FIG. 3, a first report is a report firstly made regarding (i.e., in response to) a new cyber attack. In FIG. 3, SOC (the fourth box in the top of the figure) stands for Security Operations Center, also known as Security Monitoring System in FIG. 1. A Security Operations Center is an organization (e.g., computer system) for handling cyber attacks by using device logs collected from networks, vehicle systems, and similar sources.

In FIG. 3, the term "management server" may replace longer terms such as "software distribution management server" and "over the air center" (OTA). In FIG. 3, "maker server" describes a server possessed or controlled by a manufacturer of a vehicle.

Figure 4:
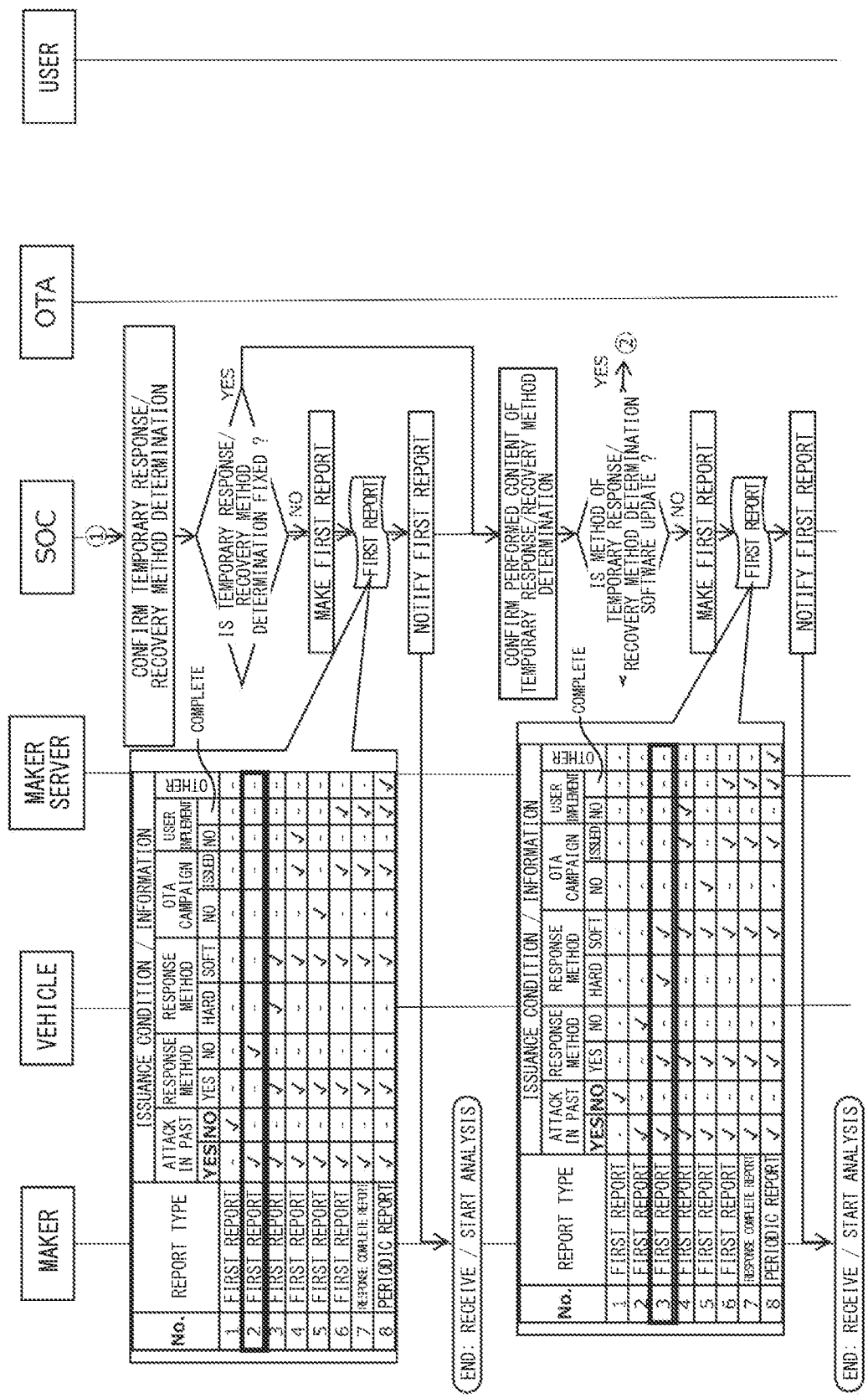
FIG. 4 is a flowchart showing the operation of the group of constituent devices according to the embodiment of the present disclosure.
Figure 5:
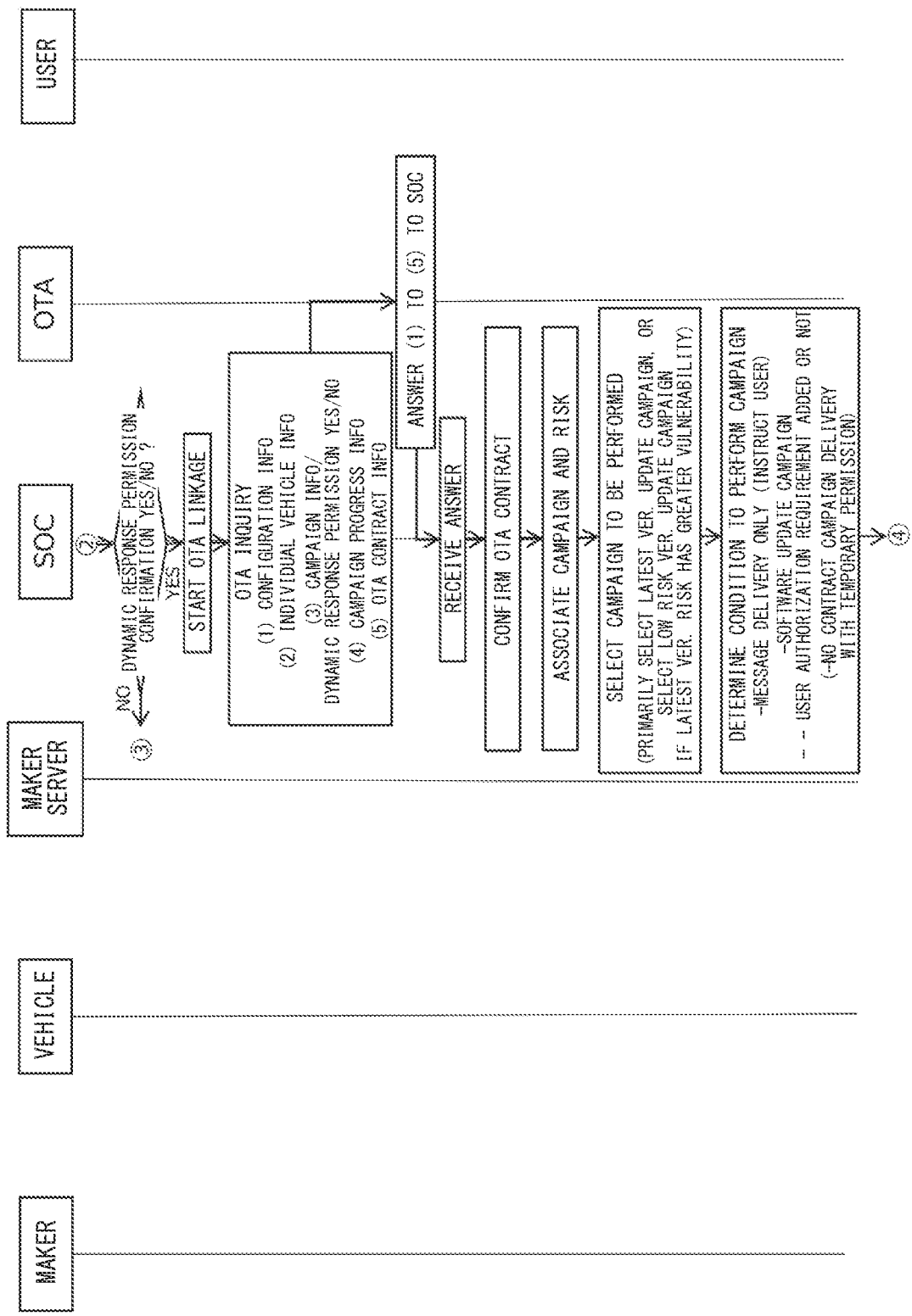
FIG. 5 is a flowchart showing the operation of the group of constituent devices according to the embodiment of the present disclosure.
Figure 6:
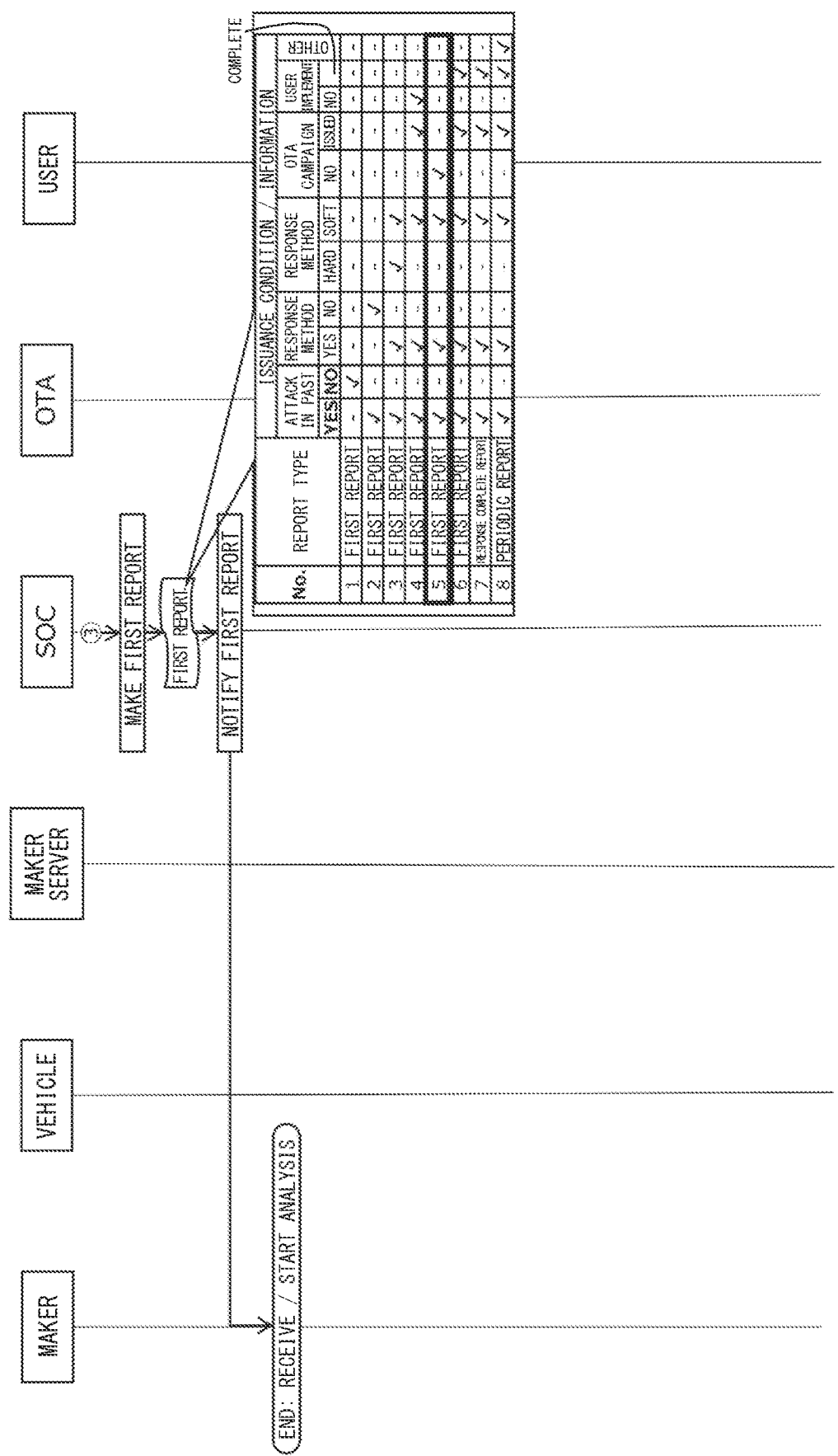
FIG. 6 is a flowchart showing the operation of the group of constituent devices according to the embodiment of the present disclosure.
Figure 7:
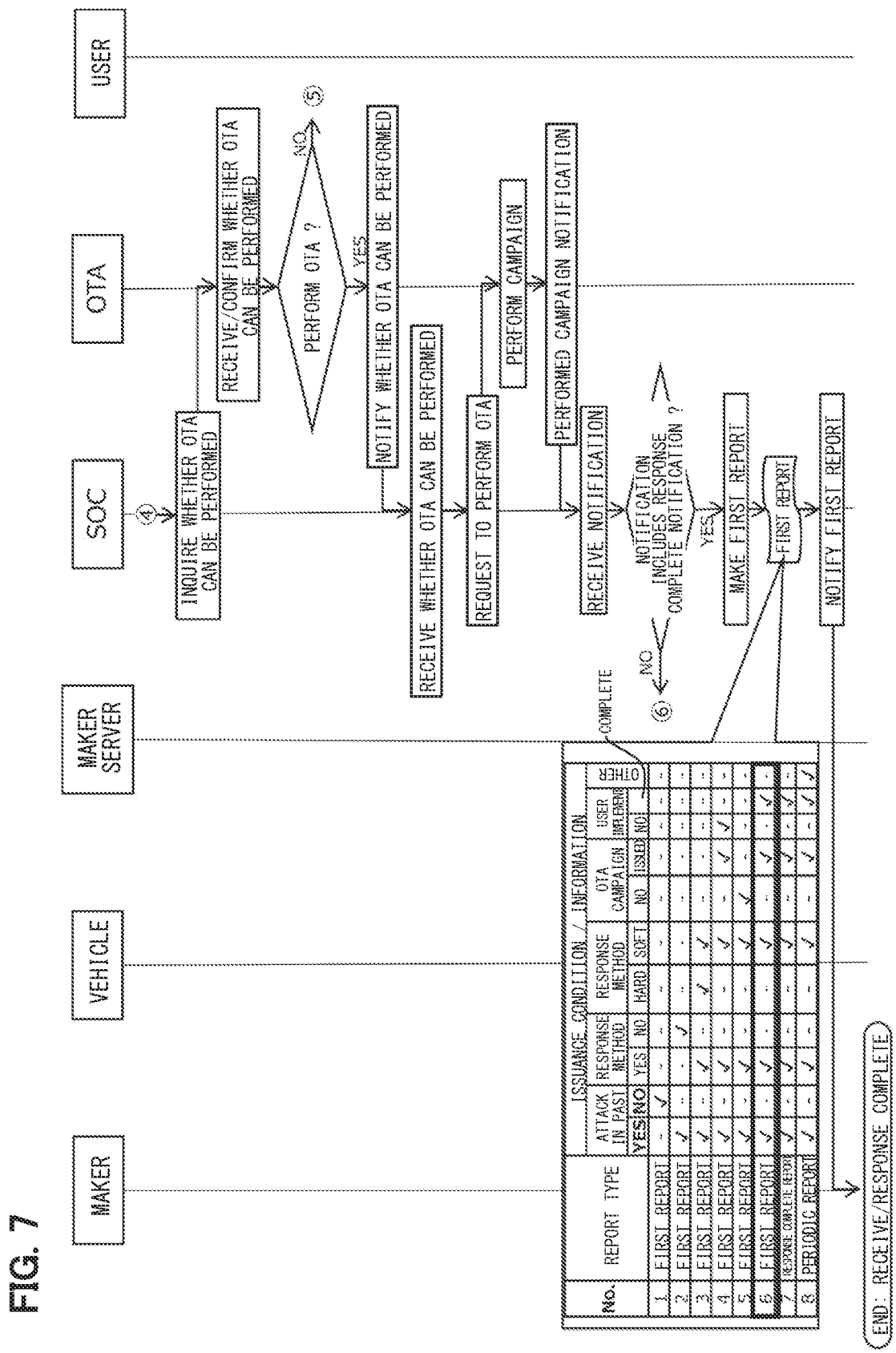
FIG. 7 is a flowchart showing the operation of the group of constituent devices according to the embodiment of the present disclosure.
Figure 8:
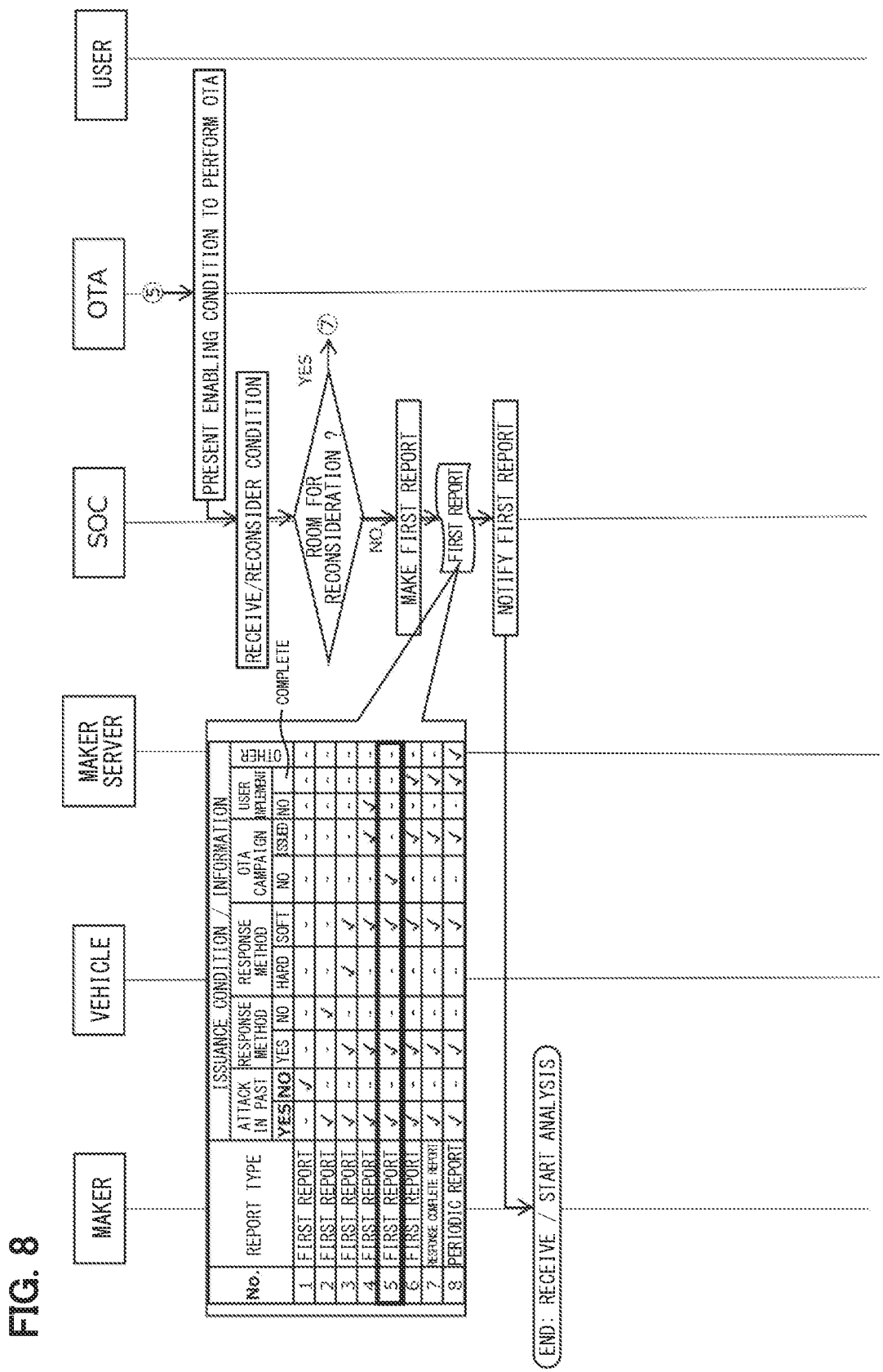
FIG. 8 is a flowchart showing the operation of the group of constituent devices according to the embodiment of the present disclosure.
Figure 9:
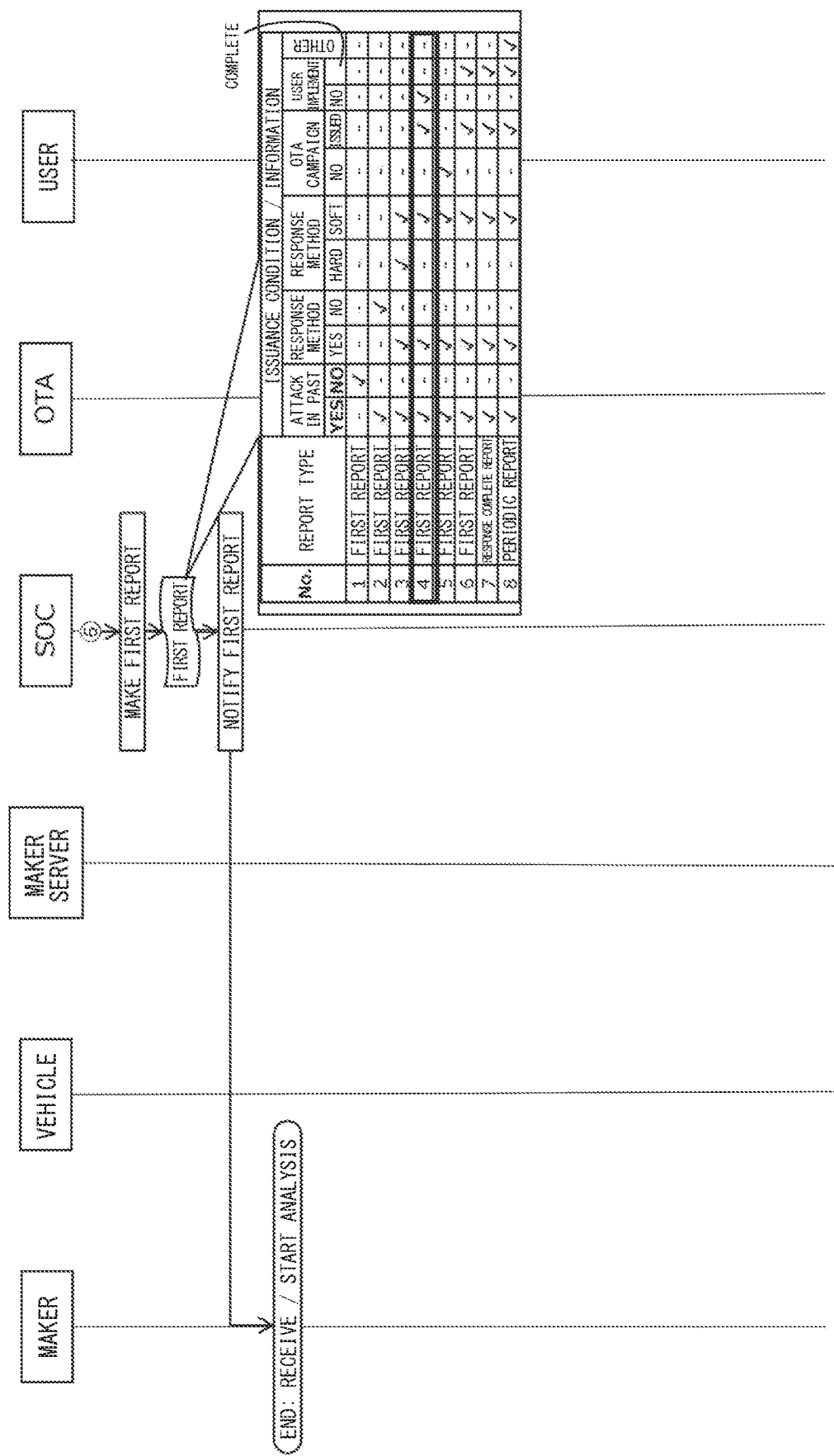
FIG. 9 is a flowchart showing the operation of the group of constituent devices according to the embodiment of the present disclosure.
Figure 10:
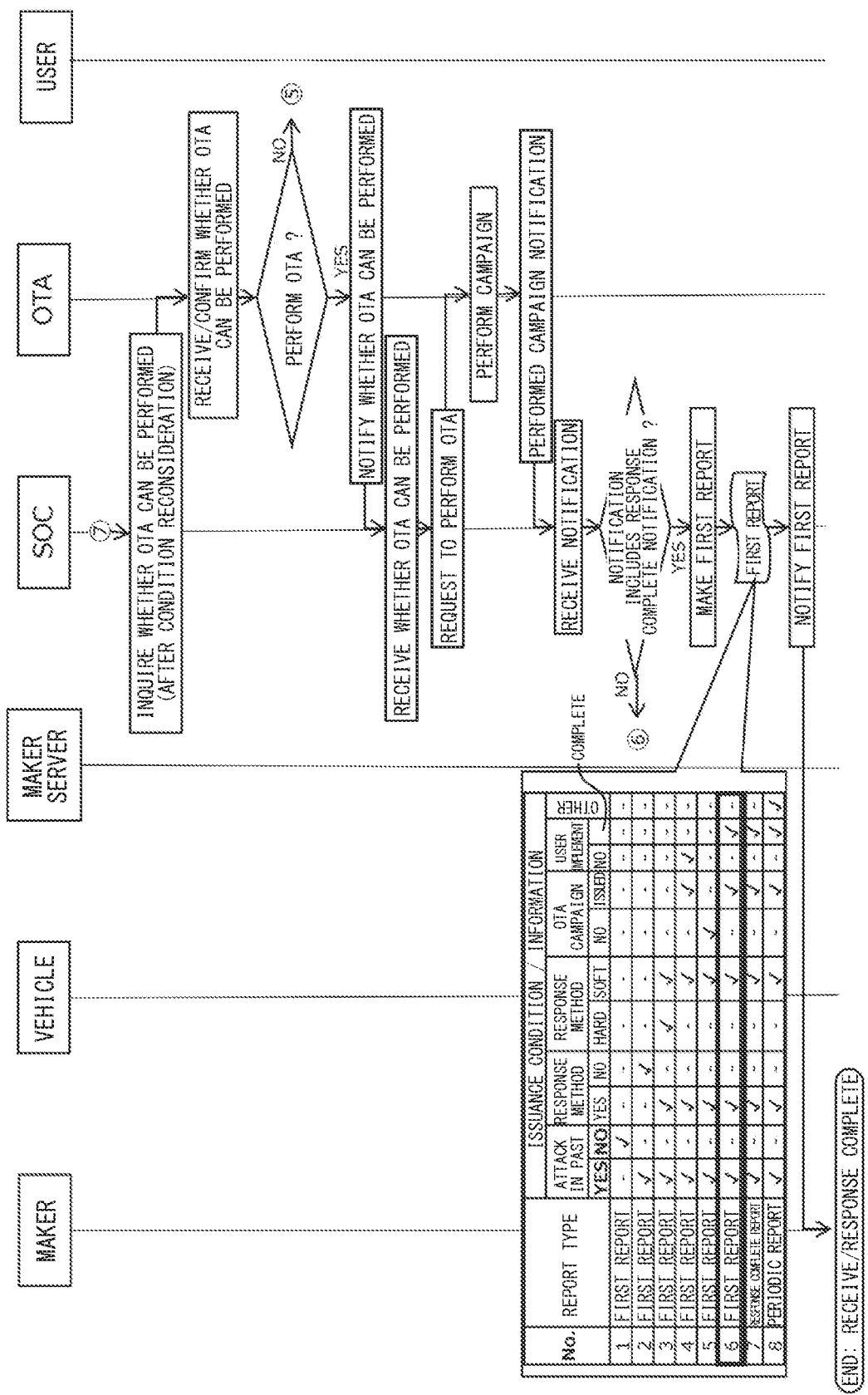
FIG. 10 is a flowchart showing the operation of the group of constituent devices according to the embodiment of the present disclosure.
Figure 11:
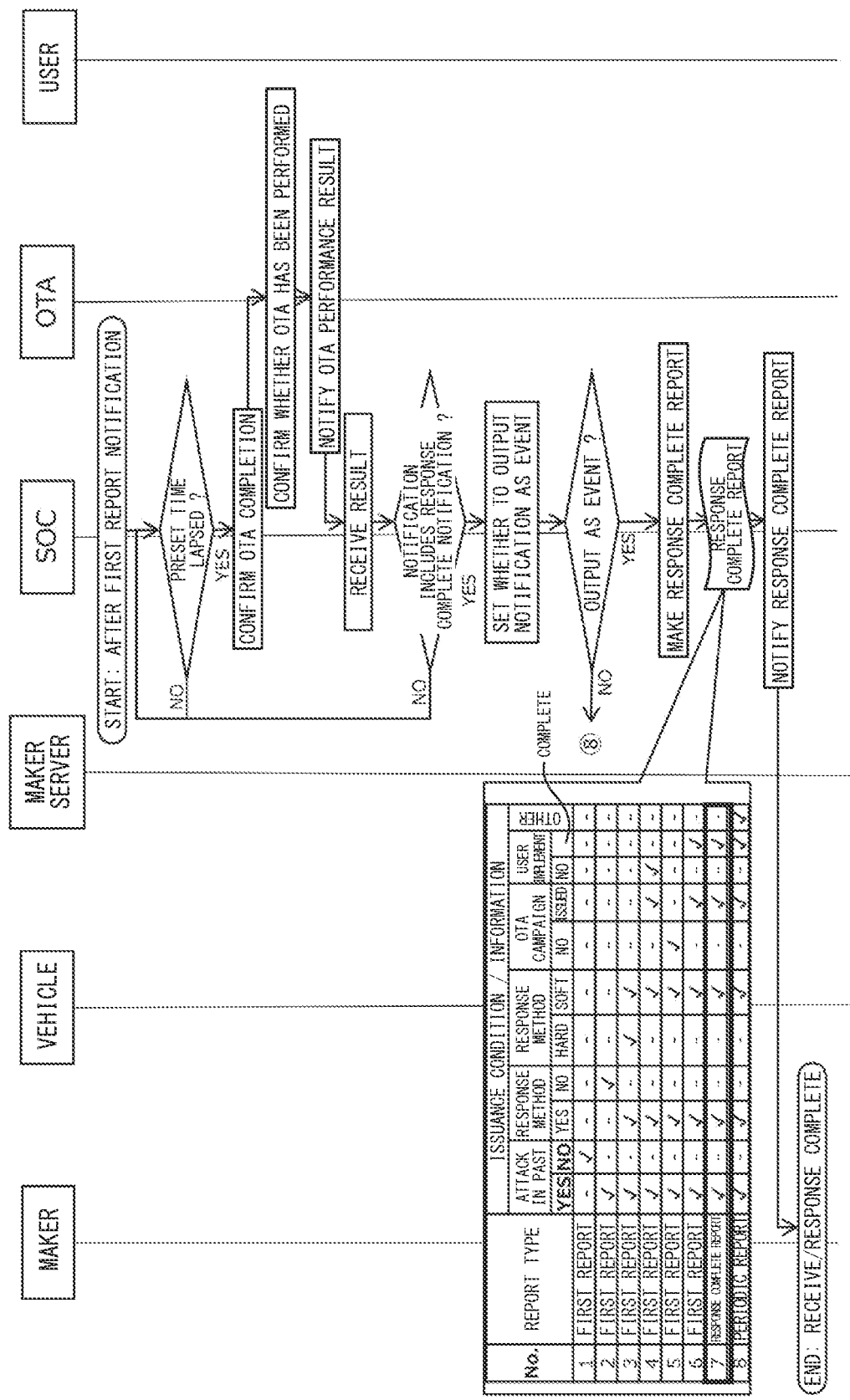
FIG. 11 is a flowchart showing the operation of the group of constituent devices according to the embodiment of the present disclosure.
Figure 12:
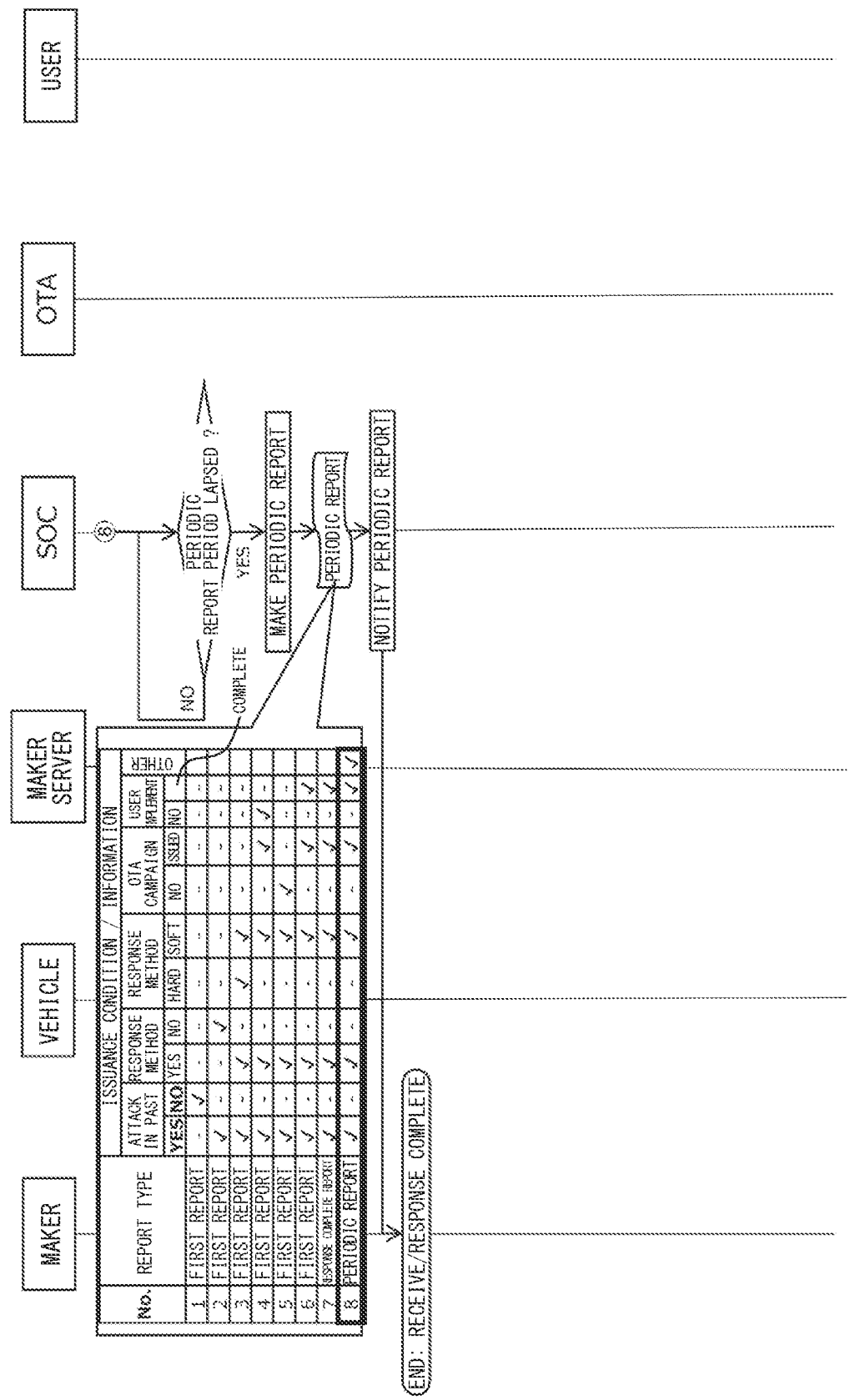
FIG. 12 is a flowchart showing the operation of the group of constituent devices according to the embodiment of the present disclosure.
Figure 13:
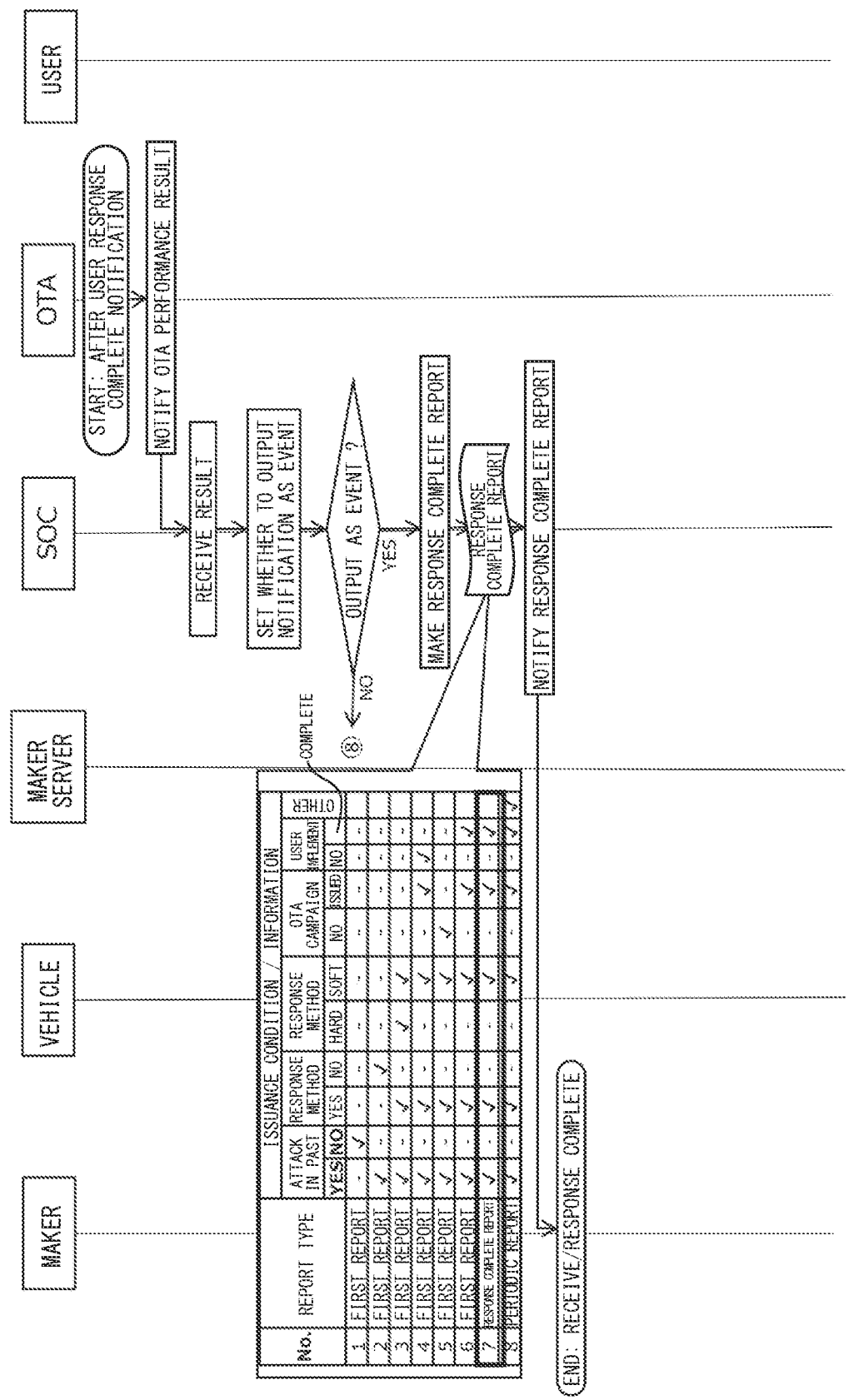
FIG. 13 is a flowchart showing the operation of the group of constituent devices according to the embodiment of the present disclosure.

In FIG. 4, the response method other than software update may include a process involving software (e.g., processing of software) other than the software update in addition to a response involving hardware. In FIG. 5, a dynamic response permission confirmation means whether or not the security monitoring system itself may make a determination (i.e., whether the system is authorized to perform a dynamic response). In FIG. 7, confirmation of whether or not OTA can be performed includes, for example, confirmation of whether or not software distribution cannot currently be performed because the campaign has expired. In FIG. 8, "room for reconsideration" means that when there are multiple campaigns, there may be other means such as examining feasibility of other campaigns or examining terms and conditions of other campaigns. In FIG. 12, the periodic report refers to a pre-planned report excluding report of sudden/emergency events.

2. SUMMARY

Each device in each embodiment of the present disclosure has been described above.

Words and phrases used in the description of each embodiment are examples and may be replaced with synonymous words or words having a synonymous function.

The block diagram used in the description of each embodiment is a diagram in which the configurations of devices and the like are classified and organized by function. An individual function represented by a function block may be implemented by (i) hardware alone (i.e., by using hardware circuitry including digital and/or analog circuits without CPU), or (ii) software alone (i.e., by using CPU along with memory storing program instructions), or (iii) any combination of the hardware and the software. Further, since the block diagram illustrates the functions, the block diagram can also be understood as disclosure of the method and the program that implements the method.

Order of function blocks that can be grasped as processing, a sequence (i.e., a flow of process), and a method described in relation to each embodiment may be changed unless some restriction is imposed, for example, such as a situation in which a result from one step is utilized by other step.

The terms "first", "second", or "N" (N is an integer) used in each embodiment and in claims of the present disclosure are used to distinguish two or more configurations and methods of the same type, thereby do not limit the order and/or superior/inferior type categorization.

Each embodiment assumes an in-vehicle device for use in a vehicle which is mounted on a vehicle, but the present disclosure also includes (i.e., is applicable to) a dedicated or general-purpose device other than the one for use in a vehicle, unless otherwise limited within the scope of the claims.

In each embodiment, the description has been made based on an assumption that the in-vehicle device disclosed in each embodiment is mounted on the vehicle, but the in-vehicle device may also be possessed by a pedestrian.

Further, examples of the form of the in-vehicle device, the security monitoring system, and the OTA center of the present disclosure include the following. Examples in the form of the parts include a semiconductor device/element, an electronic circuit, a module, and a microcontroller. Examples in the form of the semi-finished product include an electronic control unit (ECU) and a system board. Examples in the form of finished product include a mobile phone, a smartphone, a tablet, a personal computer (PC), a workstation, and a server.

Further, the examples may also include a device having a communication function such as a video camera, a still camera, and a car navigation system, for example.

Further, necessary functions such as an antenna and a communication interface may be added to the in-vehicle device, the security monitoring system, and the OTA center.

It is assumed that the security monitoring system and the OTA center of the present disclosure are used for the purpose of providing various services. With the provision of such services, the device (system) of the present disclosure will be used, the method of the present disclosure will be used, and/or the program of the present disclosure will be executed.

Further, the present disclosure is implementable not only by dedicated hardware having a configuration and a function described in relation to each embodiment, but is also implementable as a combination of (i) a program for implementing the present disclosure, which is recorded on a storage medium such as a memory, a hard disk and the like and (ii) a general-purpose hardware including dedicated or general-purpose CPU, memory, or the like, capable of executing the program.

A program stored in a non-transitory, tangible storage medium including an external storage (for example, hard disk, USB memory, CD/BD), or an internal storage (for example, RAM, ROM) in a special-purpose or general-purpose hardware (for example, computer) may be provided for, i.e., downloaded to, hardware by way of a storage medium or via a communication link from a server without using the storage medium. In such manner, it is possible to provide a latest function by updating the program.

INDUSTRIAL APPLICABILITY

Each device of the present disclosure may be intended for objects other than vehicles. In addition, it can be applied to devices used for various purposes such as mobile phones, tablets, game machines and the like.

What is claimed is:

1. A security monitoring system that detects abnormalities in a moving body and analyzes a response method, the system comprising:
    a reception unit that receives a security log from the moving body;
    an attack determination unit that analyzes the security log to determine whether or not there was a cyber attack;
    a dynamic response permission confirmation unit that confirms whether communication with a management server is permitted;
    an information requesting unit that requests the management server for predetermined information when communication with the management server is permitted; and
    an execution instruction unit that instructs the management server to execute a software update of the moving body based on the received predetermined information, wherein
    upon a determination that
       (i) a situation is determined by the attack determination unit that the cyber attack, which has happened in a past, happens again, and
       (ii) the dynamic response permission confirmation unit confirms permission,
    then the execution instruction unit determines whether the software update should be executed in response to the cyber attack based on the predetermined information received from the management server, and
    the execution instruction unit instructs the management server to execute software update of the moving body when determining that software update should be executed.

2. The security monitoring system of claim 1, wherein the predetermined information includes at least one of: configuration information, individual vehicle configuration information, campaign information, campaign progress information, and contract information.

3. The security monitoring system of claim 1, wherein the execution instruction unit selects a campaign that includes the software update as a response to the cyber attack, and
    the execution instruction unit instructs the management server to perform the selected campaign when the campaign has not been applied to the moving body.

4. The security monitoring system of claim 3, wherein the execution instruction unit makes a first report in response to the cyber attack upon receiving a notice of performing the selected campaign.

5. The security monitoring system of claim 1, wherein when a latest version software has a risk of a greater vulnerability, the execution instruction unit selects a campaign to execute software update of the moving body to a low risk version software.

6. The security monitoring system of claim 5, wherein the predetermined information includes information on the campaign to execute software update of the moving body to the low risk version software.

7. A security monitoring system comprising:
    a processor; and
    a non-transitory computer-readable storage medium, wherein the security monitoring system is configured to:

receive a security log generated by a vehicle, wherein the security log includes abnormality detection information associated with a current attack;
obtain a current attack determination result based at least partly upon the security log;
determine whether the current attack determination result corresponds with at least one of past attacks, which has happened in a past;
confirm whether communication with a management server is permitted;
request the management server for predetermined information when communication with the management server is permitted;
upon a determination that the current attack determination result does NOT correspond with at least one of the past attacks:
 (i) generate a negative first report, and
 (ii) notify a maker of the vehicle regarding the first negative report;
upon a determination that the current attack determination result corresponds with at least one of the past attacks, and that communication with the management server is permitted,
 (i) then determine whether the software update should be executed in response to the current attack determination result, based on the predetermined information received from the management server,
 (ii) instruct the management server to execute software update of the moving body when determining that software update should be executed,
 (iii) confirm a temporary response/recovery method determination, and
 (iv) determine whether the temporary response/recovery method was successful.

8. The security monitoring system of claim 7, wherein upon a determination that the temporary response/recovery method was not successful:
 (i) make a unsuccessful response first report, and
 (ii) notify the maker regarding the unsuccessful response first report.

9. The security monitoring system of claim 7, wherein upon a determination that the temporary response/recovery method was successful:
 (i) confirm performed content of the temporary response/recovery method, and
 (ii) determine whether the temporary response/recovery method includes a software update.

10. The security monitoring system of claim 7, wherein the security monitoring system is configured to:
on determination that a latest version software has a risk of a greater vulnerability,
 select a campaign to execute software update of the moving body to a low risk version software.

11. The security monitoring system of claim 10, wherein the predetermined information includes information on the campaign to execute software update of the moving body to the low risk version software.

* * * * *